United States Patent
Inoue et al.

(10) Patent No.: US 9,151,381 B2
(45) Date of Patent: Oct. 6, 2015

(54) VEHICLE, CONTROL METHOD FOR TRANSMISSION AND CONTROL DEVICE FOR TRANSMISSION

(75) Inventors: Daisuke Inoue, Toyota (JP); Akihide Ito, Nagoya (JP); Seiji Kuwahara, Toyota (JP); Shinya Toyoda, Nissin (JP); Motonori Kimura, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 672 days.

(21) Appl. No.: 13/377,407

(22) PCT Filed: Mar. 15, 2010

(86) PCT No.: PCT/JP2010/054313
§ 371 (c)(1),
(2), (4) Date: Dec. 9, 2011

(87) PCT Pub. No.: WO2011/114418
PCT Pub. Date: Sep. 22, 2011

(65) Prior Publication Data
US 2012/0083979 A1    Apr. 5, 2012

(51) Int. Cl.
*F16H 61/00* (2006.01)
*F16H 61/662* (2006.01)
*F16H 61/02* (2006.01)
*B60W 10/06* (2006.01)
*F16H 59/44* (2006.01)
(Continued)

(52) U.S. Cl.
CPC ......... *F16H 61/66259* (2013.01); *B60W 10/06* (2013.01); *F16H 59/44* (2013.01); *F16H 61/0213* (2013.01); *F16H 61/061* (2013.01); *F16H 61/16* (2013.01)

(58) Field of Classification Search
CPC ... F16H 61/0213; F16H 59/44; F16H 61/061; F16H 61/16; B60W 10/06
USPC .......... 701/51, 54–58, 61, 62, 66, 67; 477/34, 477/37, 39, 44–46, 64, 80, 76, 91, 98, 132; 474/28
See application file for complete search history.

(56) References Cited

U.S. PATENT DOCUMENTS

| 6,560,522 B2 * | 5/2003 | Katakura et al. | 701/54 |
| 6,875,152 B2 * | 4/2005 | Iwatuki et al. | 477/44 |
| 7,513,847 B2 * | 4/2009 | Tabata et al. | 477/15 |

(Continued)

FOREIGN PATENT DOCUMENTS

| JP | 05-085228 A | 4/1993 |
| JP | 2005-163912 A | 6/2005 |

(Continued)

*Primary Examiner* — James Trammell
*Assistant Examiner* — Majdi Alsomiri
(74) *Attorney, Agent, or Firm* — Sughrue Mion, PLLC

(57) ABSTRACT

One control mode is selected from a plurality of control modes each setting a target value of a primary pulley revolution speed NIN and prioritized in a predetermined order. When the control mode is changed, the target value of the primary pulley revolution speed NIN is set so as to vary from the target value set in the control mode before change to the target value set in the control mode after change in accordance with the control mode that is higher in priority among the control modes before and after change. A continuously variable transmission is controlled such that the primary pulley revolution speed NIN reaches the set target value.

4 Claims, 11 Drawing Sheets

(51) Int. Cl.
    *F16H 61/06*    (2006.01)
    *F16H 61/16*    (2006.01)

(56) References Cited

U.S. PATENT DOCUMENTS

2006/0166784 A1* 7/2006 Tabata et al. .................. 477/37
2007/0099754 A1* 5/2007 Yamaguchi et al. ........... 477/44
2007/0298918 A1* 12/2007 Toyoda et al. .................. 474/28
2009/0037061 A1* 2/2009 Tabata et al. .................... 701/55
2011/0015833 A1* 1/2011 Urata et al. ..................... 701/51

FOREIGN PATENT DOCUMENTS

JP    2005-273721 A    10/2005
JP    2007-022483 A    2/2007

* cited by examiner

F I G. 1
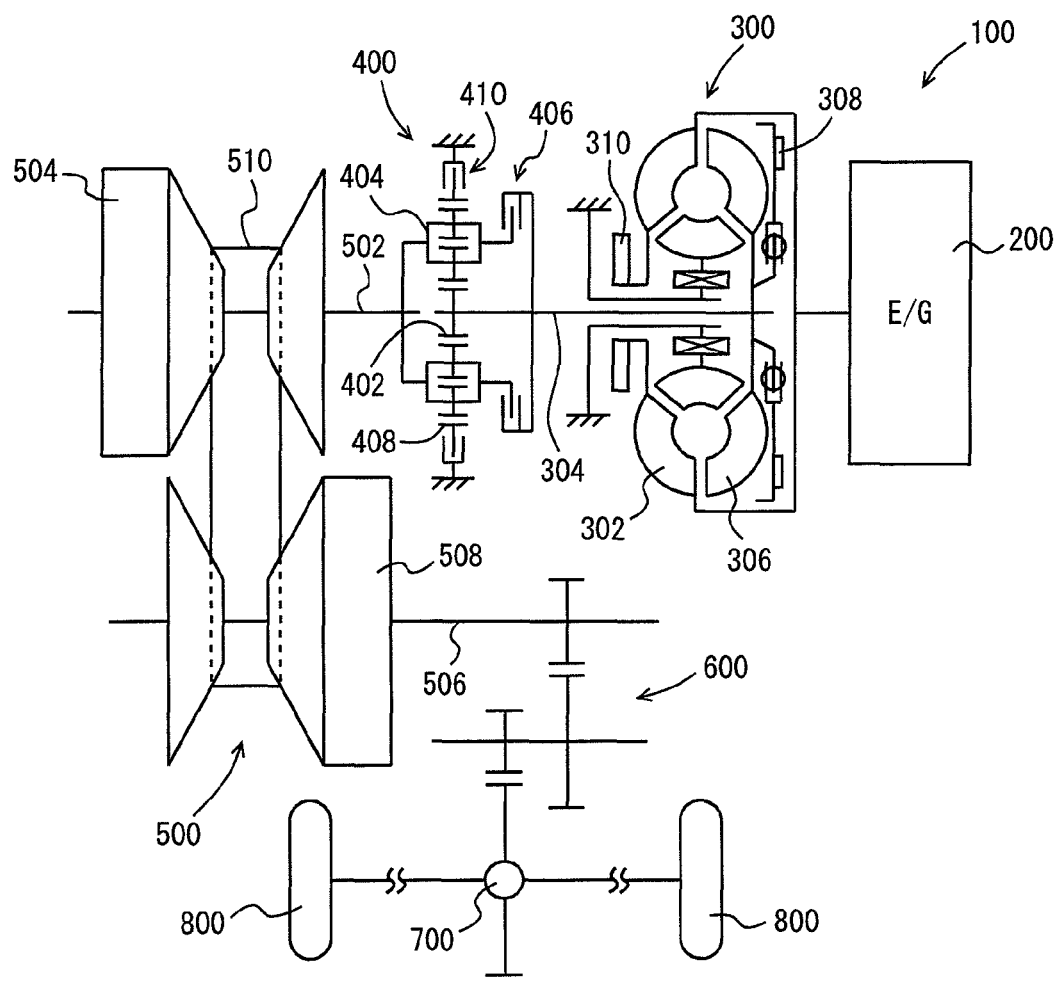

FIG. 7

| | ORDER OF PRIORITY | CONSTANT X |
|---|---|---|
| CONTROL MODE B | 1 | $X_1$ |
| CONTROL MODE C | 2 | $X_2$ |
| CONTROL MODE D | 3 | $X_3$ |
| CONTROL MODE E | 4 | $X_4$ |
| CONTROL MODE A | 5 | — |

F I G. 1 1

|  | ORDER OF PRIORITY | CONSTANT X | |
|---|---|---|---|
|  |  | FIRST CONSTANT XA | SECOND CONSTANT XB |
| CONTROL MODE B | 1 | $XA_1$ | $XB_1$ |
| CONTROL MODE C | 2 | $XA_2$ | — |
| CONTROL MODE D | 3 | — | $XB_3$ |
| CONTROL MODE E | 4 | $XA_4$ | $XB_4$ |
| CONTROL MODE A | 5 | — | — |

VEHICLE, CONTROL METHOD FOR TRANSMISSION AND CONTROL DEVICE FOR TRANSMISSION

CROSS REFERENCE TOP RELATED APPLICATIONS

This application is a National Stage of International Application No. PCT/JP2010/054313 filed Mar. 15, 2010, the contents of all of which are incorporated herein by reference in their entirety.

TECHNICAL FIELD

The present invention relates to a vehicle, a control method for a transmission, and a control device for the transmission, and particularly to a technique for selecting one control mode from a plurality of control modes to set a target value of the revolution speed of a transmission in accordance with the selected control mode.

BACKGROUND ART

A continuously variable transmission (CVT) which can continuously change a gear ratio is known. In the continuously variable transmission, for example, a metal belt or a chain is held by each of a primary pulley and a secondary pulley. Also in the continuously variable transmission, the gear ratio is changed generally by changing the hydraulic pressure supplied to the primary pulley, and more specifically, the hydraulic pressure supplied to a primary sheave of the primary pulley.

For example, as the hydraulic pressure supplied to the primary sheave of the primary pulley is increased, the groove width of the primary pulley is narrowed. Consequently, the effective diameter of the primary pulley is increased. In accordance with an increase in the effective diameter of the primary pulley, the groove width of the secondary pulley is increased and the effective diameter thereof is decreased, with the result that the continuously variable transmission upshifts.

In contrast, as the hydraulic pressure supplied to the primary sheave of the primary pulley is decreased, the groove width of the primary pulley is increased. Consequently, the effective diameter of the primary pulley is decreased. In accordance with a decrease in the effective diameter of the primary pulley, the groove width of the secondary pulley is narrowed and the effective diameter thereof is increased, with the result that the continuously variable transmission downshifts.

The gear ratio of the continuously variable transmission is controlled based on the accelerator pedal position and the like. Japanese Patent Laying-Open No. 5-85228 (Patent Document 1) discloses a hierarchically configured electronic system in which a target output torque is determined based on the accelerator pedal position and the brake signal, and the target gear ratio is determined based on the determined target output torque and the vehicle speed.

Furthermore, the gear ratio of the continuously variable transmission is generally controlled such that the input shaft revolution speed reaches the set target value. The target value of the input shaft revolution speed is set in accordance with various control modes. For example, in the normal control mode, the target value of the input shaft revolution speed is set based on the information such as an accelerator pedal position, a vehicle speed, a brake signal, and the like. In the control mode in which a driver operates a shift lever or a paddle switch to request an upshift or a downshift, the target value of the input shaft revolution speed is set to be increased in proportion to the vehicle speed. In the control mode in which the target value of the input shaft revolution speed is set in accordance with the road on which the vehicle travels, the target value of the input shaft revolution speed is appropriately set based on the gradient of the road and the information of the corner (shape and the like of the curve) from the navigation system mounted in the vehicle. In addition, various control modes for setting the target value of the input shaft revolution speed are being put into practical use. The target value that is to be finally used is selected from the target values that are set in these various control modes. In other words, the target value that is to be finally used is selected by arbitrating the target value that is set in each control mode.

CITATION LIST

Patent Literature

PTL 1: Japanese Patent Laying-Open No. 5-85228

SUMMARY OF INVENTION

Technical Problem

In the case where the control mode is changed, when the target value set in the control mode before change is different from the target value set in the control mode after change, the gear ratio of the continuously variable transmission may suddenly change. Accordingly, the target value needs to be set so as to suitably vary from the target value set in the control mode before change to the target value set in the control mode after change. However, the amount of data may be enormously increased if the manner of change in the target value is defined for every combination of the control mode before change and the control mode after change.

An object of the present invention is to decrease the amount of data required for setting the target value of the revolution speed of a transmission such that the target value is suitably changed.

Solution to Problem

A vehicle according to an embodiment includes a transmission and a control device that controls the transmission. The control device selects one control mode from a plurality of control modes each setting a target value of a revolution speed of the transmission and prioritized in a predetermined order. When the control mode is changed, the control device sets the target value so as to vary from the target value set in the control mode before change to the target value set in the control mode after change in accordance with the control mode that is higher in priority among the control mode before change and the control mode after change. The control device controls the transmission such that the revolution speed of the transmission reaches the target value.

Advantageous Effects of Invention

Irrespective of the combination of the control mode before change and the control mode after change, the target value of the revolution speed of the transmission is set so as to vary in accordance with the control mode that is higher in priority among the control mode before change and the control mode after change. Consequently, even if the manner of change in the target value is not defined for every combination of the control mode before change and the control mode after change, the target value of the revolution speed of the transmission can be set so as to suitably vary in accordance with the control mode that is higher in priority. This allows a decrease in the amount of the data required for setting the target value of the revolution speed of the transmission such that the target value suitably varies.

BRIEF DESCRIPTION OF DRAWINGS

FIG. 1 is a diagram showing a drive device of a vehicle.

FIG. 7 is a diagram showing the order of priority and a constant X of each control mode.

FIG. 11 is a diagram showing the order of priority, a first constant XA and a second constant XB of each control mode.

DESCRIPTION OF EMBODIMENTS

Figure 2:
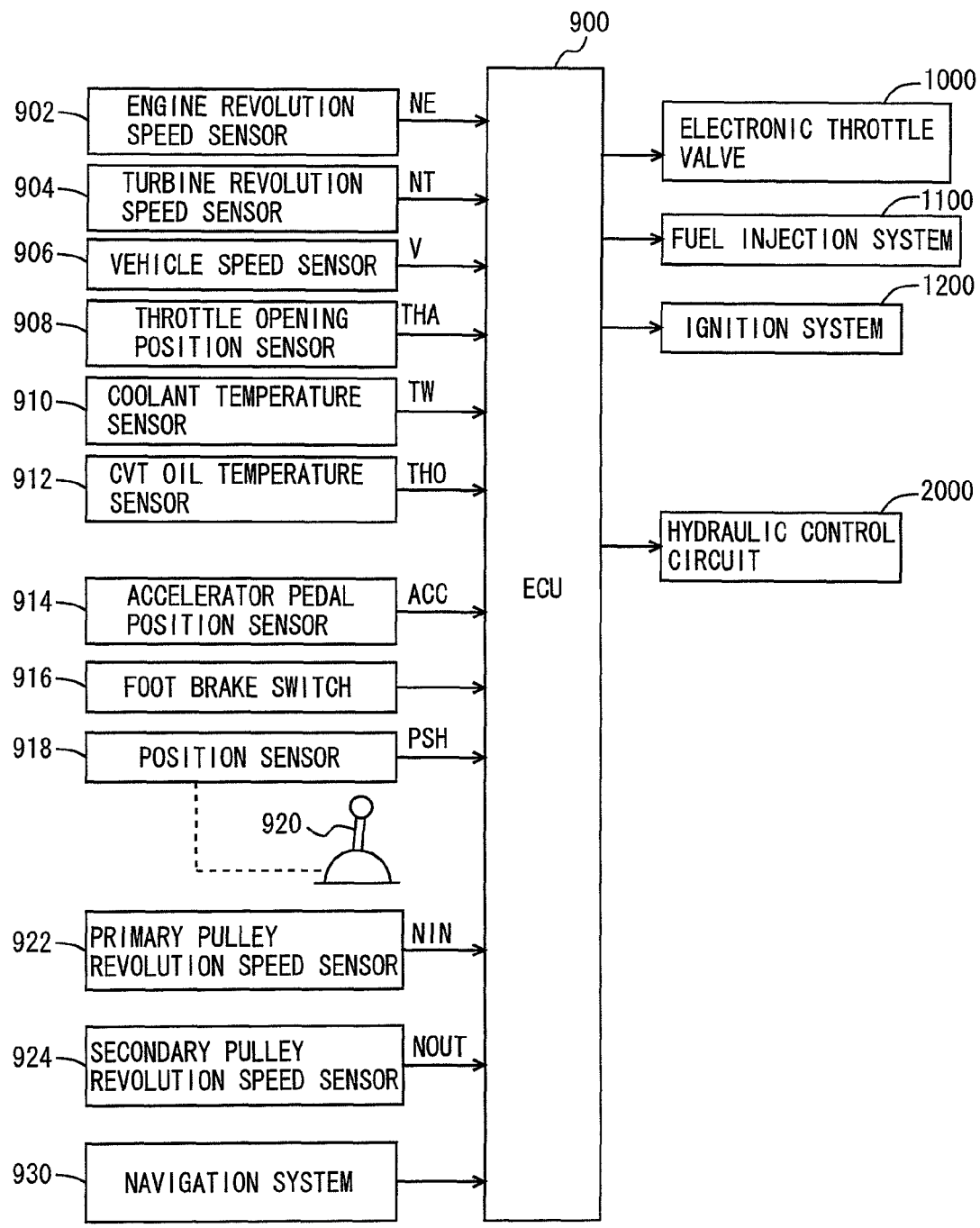
FIG. 2 is a block diagram of a control system of the vehicle.

The embodiments of the present invention will be hereinafter described with reference to the accompanying drawings, in which the same components are designated by the same reference characters and have the same names and functions. Accordingly, detailed description thereof will not be repeated.

First Embodiment

Referring to FIG. 1, the output power of an engine 200 of a power train 100 mounted in the vehicle is input into a continuously variable transmission 500 having a forward and backward movement switching device 400 through a torque converter 300. The output power of continuously variable transmission 500 is transmitted to a reduction gear 600 and a differential gear 700, and distributed to a driving wheel 800 on each of the right and left sides. Power train 100 is controlled by an ECU (Electronic Control Unit) 900 described below. In place of or in addition to engine 200, a motor may be used as a driving source. A multi-speed automatic transmission may be used in place of continuously variable transmission 500.

Torque converter 300 includes a pump impeller 302 coupled to the crankshaft of engine 200 and a turbine runner 306 coupled to forward and backward movement switching device 400 via a turbine shaft 304. A lock-up clutch 308 is provided between pump impeller 302 and turbine runner 306. Lock-up clutch 308 is engaged or disengaged when the supply of the hydraulic pressure to the oil chamber is switched between the engagement side and the disengagement side.

When lock-up clutch 308 is completely engaged, pump impeller 302 and turbine runner 306 are integrally rotated. Pump impeller 302 is provided with a mechanical oil pump 310 which generates hydraulic pressure used for performing the shift control of continuously variable transmission 500, generating the belt holding pressure by which the belt is pressed laterally from both sides and supplying the ATF (Automatic Transmission Fluid) for lubrication to each unit.

Forward and backward movement switching device 400 includes a double-pinion type planetary gear train. Turbine shaft 304 of torque converter 300 is coupled to a sun gear 402. An input shaft 502 of continuously variable transmission 500 is coupled to a carrier 404. Carrier 404 and sun gear 402 are coupled to each other through a forward clutch 406. A ring gear 408 is fixed to a housing via a reverse brake 410. Forward clutch 406 and reverse brake 410 are frictionally engaged by a hydraulic cylinder. The input revolution speed of forward clutch 406 is equal to the revolution speed of turbine shaft 304, that is, a turbine revolution speed NT.

Forward clutch 406 is engaged and reverse brake 410 is disengaged, to thereby cause forward and backward movement switching device 400 to be in the engaged state for forward running. In this state, the driving force in the forward running direction is transmitted to continuously variable transmission 500. Reverse brake 410 is engaged and forward clutch 406 is disengaged, to thereby cause forward and backward movement switching device 400 to be in the engaged state for backward running. In this state, input shaft 502 is rotated in the opposite direction with respect to turbine shaft 304. This causes the driving force in the backward running direction to be transmitted to continuously variable transmission 500.

In other words, as forward clutch 406 or reverse brake 410 is engaged, the power output from engine 200 is transmitted to driving wheel 800. When forward clutch 406 and reverse brake 410 are both disengaged, forward and backward movement switching device 400 goes into the neutral state in which power transmission is interrupted.

It is to be noted that forward and backward movement switching device 400 may be disposed between continuously variable transmission 500 and driving wheel 800.

Continuously variable transmission 500 further includes a primary pulley 504 provided in input shaft 502, a secondary pulley 508 provided in an output shaft 506, and a metal belt 510 wound around these pulleys. The friction force between each pulley and metal belt 510 is used for power transmission.

Each pulley is formed of a hydraulic cylinder (sheave) such that its groove has a variable width. The hydraulic pressure of the hydraulic cylinder of primary pulley 504, that is, a primary sheave, is controlled, so that the groove width of each pulley varies. This causes a change in the effective diameter of each pulley and thus allows a continuous change in a gear ratio GR (=a primary pulley revolution speed NIN/a secondary pulley revolution speed NOUT). It is to be noted that a chain may be used in place of metal belt 510.

As shown in FIG. 2, ECU 900 receives a signal from an engine revolution speed sensor 902, a turbine revolution speed sensor 904, a vehicle speed sensor 906, a throttle opening position sensor 908, a coolant temperature sensor 910, an oil temperature sensor 912, an accelerator pedal position sensor 914, a foot brake switch 916, a position sensor 918, a primary pulley revolution speed sensor 922, and a secondary pulley revolution speed sensor 924. ECU 900 also receives a signal representative of the information of the corner (the shape of a curve and the like) from a navigation system 930.

Engine revolution speed sensor 902 detects a revolution speed (engine revolution speed) NE of engine 200. Turbine revolution speed sensor 904 detects a revolution speed (turbine revolution speed) NT of turbine shaft 304. Vehicle speed sensor 906 detects a vehicle speed V. Throttle opening position sensor 908 detects an opening position THA of the electronic throttle valve. Coolant temperature sensor 910 detects a coolant temperature TW of engine 200. Oil temperature sensor 912 detects a temperature (hereinafter also referred to as an oil temperature) THO of the ATF that is used for actuating continuously variable transmission 500. Accelerator pedal position sensor 914 detects an accelerator pedal position ACC. Foot brake switch 916 detects whether the foot brake is operated or not. Position sensor 918 detects a position PSH of a shift lever 920 by determining whether the contact point provided in the position corresponding to the shift position is ON or OFF. Primary pulley revolution speed sensor 922 detects a revolution speed (input shaft revolution speed) NIN of primary pulley 504. Secondary pulley revolution speed sensor 924 detects a revolution speed (output shaft revolution speed) NOUT of secondary pulley 508. The signal representative of the detection result of each sensor is transmitted to ECU 900. During forward running in which forward clutch 406 is engaged, turbine revolution speed NT is equal to primary pulley revolution speed NIN. Vehicle speed V attains a value corresponding to secondary pulley revolution speed NOUT. Consequently, in the state where the vehicle is at a standstill and forward clutch 406 is engaged, turbine revolution speed NT becomes 0.

ECU 900 includes a CPU (Central Processing Unit), a memory, an input/output interface, and the like. The CPU performs signal processing in accordance with the program stored in the memory, to perform output power control of engine 200, shift control of continuously variable transmission 500, control of the belt holding pressure, engagement/disengagement control of forward clutch 406, engagement/disengagement control of reverse brake 410, and the like.

The output power of engine 200 is controlled by an electronic throttle valve 1000, a fuel injection system 1100, an ignition system 1200, and the like. A hydraulic control circuit 2000 serves to perform shift control of continuously variable transmission 500, control of the belt holding pressure, engagement/disengagement control of forward clutch 406, and engagement/disengagement control of reverse brake 410.

Figure 3:
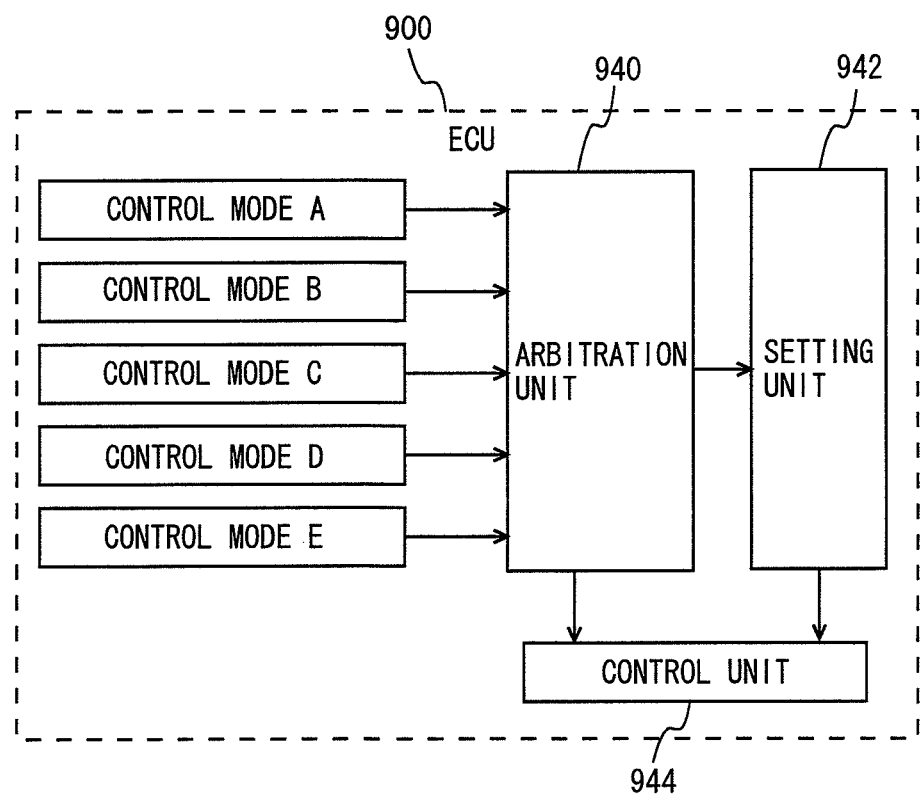
FIG. 3 is a functional block diagram of an ECU in the first embodiment.

Gear ratio GR of continuously variable transmission 500 is controlled, for example, such that primary pulley revolution speed NIN reaches the target value set by ECU 900. As shown in FIG. 3, the target value of primary pulley revolution speed NIN is set in each of the plurality of control modes.

Figure 4:
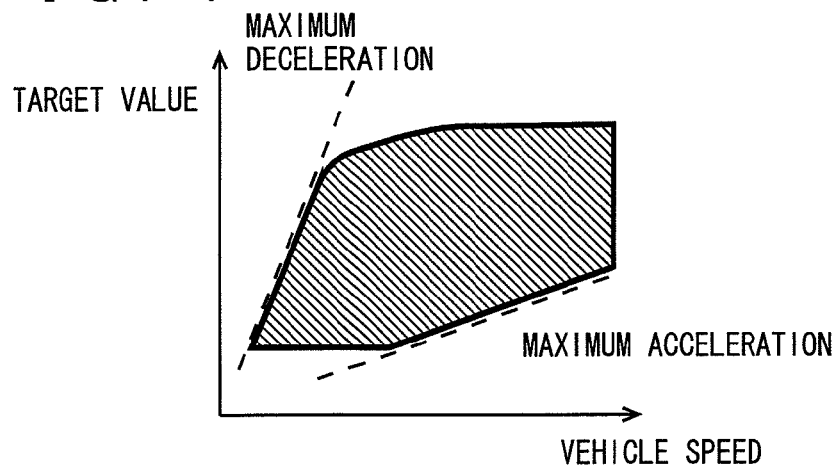
FIG. 4 is a (first) diagram showing the range in which the target value of a primary pulley revolution speed NIN is set.

For example, in the normal control mode A, when the transmission range is in a "D" range, the target value of primary pulley revolution speed NIN is set based on the information including an accelerator pedal position, a vehicle speed, a brake signal, and the like, to fall within the region marked with diagonal lines in FIG. 4. More specifically, based on the accelerator pedal position, the vehicle speed, the brake signal, and the like, the target driving force of the vehicle is set in accordance with a map and the like. The target output torque of continuously variable transmission 500 is calculated from the target driving force, the gear ratio of reduction gear 600, the gear ratio of differential gear 700, the radius of driving wheel 800, and the like. Based on the map including a target output torque, a vehicle speed (secondary pulley revolution speed NOUT) and the like as a parameter, the target value of primary pulley revolution speed NIN is set. The method of setting the target value of primary pulley revolution speed NIN in control mode A is not limited thereto.

In a control mode B, the target value of primary pulley revolution speed NIN is set in accordance with the conditions of the road on which the vehicle runs. In control mode B, the target value of primary pulley revolution speed NIN is appropriately set based on the gradient of the road and the information of the corner (shape of the curve and the like) from navigation system 930 mounted in the vehicle. For example, the target value of primary pulley revolution speed NIN is set such that continuously variable transmission 500 downshifts in the vicinity of the beginning of the curve, and when the vehicle travels out of the curve, continuously variable transmission 500 upshifts. The method of setting the target value of primary pulley revolution speed NIN in control mode B is not limited thereto.

In a control mode C, the target value of primary pulley revolution speed NIN is appropriately set based on the gradient of the road on which the vehicle runs. For example, an upshift is limited on the uphill slope in order to secure a required driving force. On a downhill slope, continuously variable transmission 500 downshifts in order to obtain an appropriate engine brake force. The method of setting the target value of primary pulley revolution speed NIN in control mode C is not limited thereto.

Figure 5:
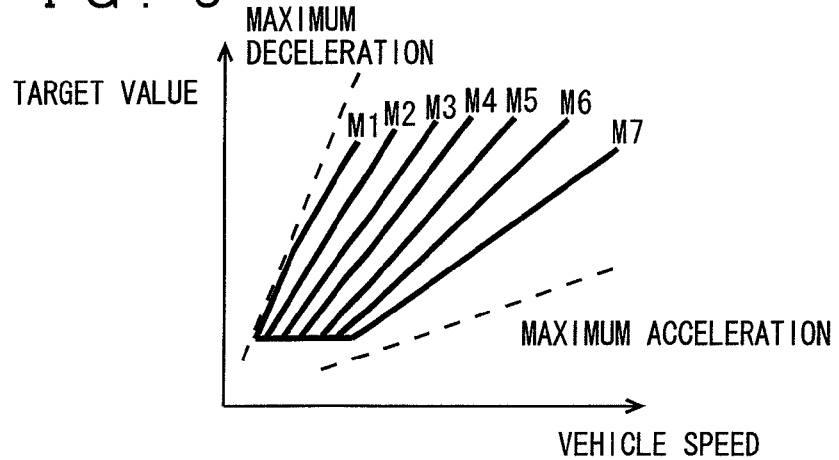
FIG. 5 is a (second) diagram showing the range in which the target value of primary pulley revolution speed NIN is set.

In a control mode D, the driver operates shift lever 920 or a paddle switch (not shown) to request an upshift or a downshift. In control mode D, as indicated by a solid line in FIG. 5, the target value of primary pulley revolution speed NIN is set so as to maintain gear ratios M1 to M7 selected by the driver operating shift lever 920 or the paddle switch (not shown). In other words, the target value of primary pulley revolution speed NIN is set to be increased in proportion to the vehicle speed. Furthermore, in control mode D, when the vehicle speed reaches the set vehicle speed, continuously variable transmission 500 automatically upshifts or downshifts. The number of the gear ratios may be less than or greater than seven. The method of setting the target value of primary pulley revolution speed NIN in control mode D is not limited thereto.

Figure 6:
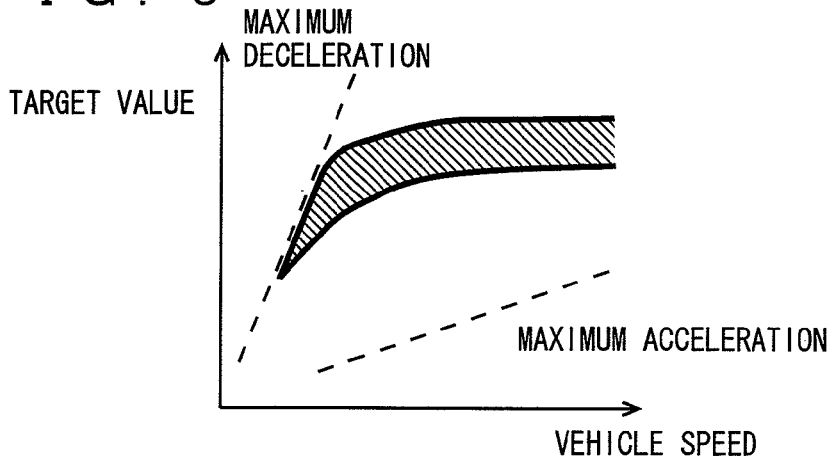
FIG. 6 is a (third) diagram showing the range in which the target value of primary pulley revolution speed NIN is set.

In a control mode E, when the transmission range is in a "B" range, the target value of primary pulley revolution speed NIN is set based on the information including an accelerator pedal position, a vehicle speed, a brake signal, and the like, to fall within the region marked with diagonal lines shown in FIG. 6. The lower limit value of the target value of primary pulley revolution speed NIN in control mode E is greater than the lower limit value of the target value of primary pulley revolution speed NIN in control mode A. In other words, in control mode E, the upshift of continuously variable transmission 500 is limited as compared with the case in control mode A. The method of setting the target value of primary pulley revolution speed NIN in control mode E is not limited thereto.

The above-described control modes are merely by way of example. The number of control modes is not limited to five. The control modes less than five or more than five may be set. The type of the control mode is optionally determined by the developer. Each control mode may be configured by software, by hardware, or by a combination of software and hardware.

As shown in FIG. 7, a plurality of control modes are prioritized in a predetermined order. The order of priority is determined by the developer. Furthermore, a constant X is predetermined for each control mode except for the lowest-priority control mode. The order of priority shown in FIG. 7 is merely by way of example. Constant X is a numeric value in the range of 0 to 1, for example. The order of priority and the use of the constant will be described later. The change rate of the target value of primary pulley revolution speed NIN (gradient) may be determined in place of constant X.

Referring back to FIG. 3, ECU 900 selects one control mode from a plurality of control modes in accordance with the running conditions of the vehicle. In other words, ECU 900 selects (sets) the target value that is to be finally used from the target values set in the control modes. In ECU 900, arbitration unit 940 serves to arbitrate the target value set in each control mode, thereby selecting the target value that is to be finally used. It is appropriately defined by the developer as to which control mode is selected for each running condition. Arbitration unit 940 may be configured by software, by hardware, or by a combination of software and hardware.

When the control mode is changed, a setting unit 942 of ECU 900 sets the target value so as to vary from the target value set in the control mode before change to the target value set in the control mode after change, in accordance with the control mode that is higher in priority among the control modes before and after change. More specifically, when the control mode is changed, setting unit 942 of ECU 900 sets the target value so as to vary in accordance with constant X determined for the control mode that is higher in priority among the control modes before and after change. Setting unit 942 may be configured by software, by hardware, or by a combination of software and hardware.

Figure 8:
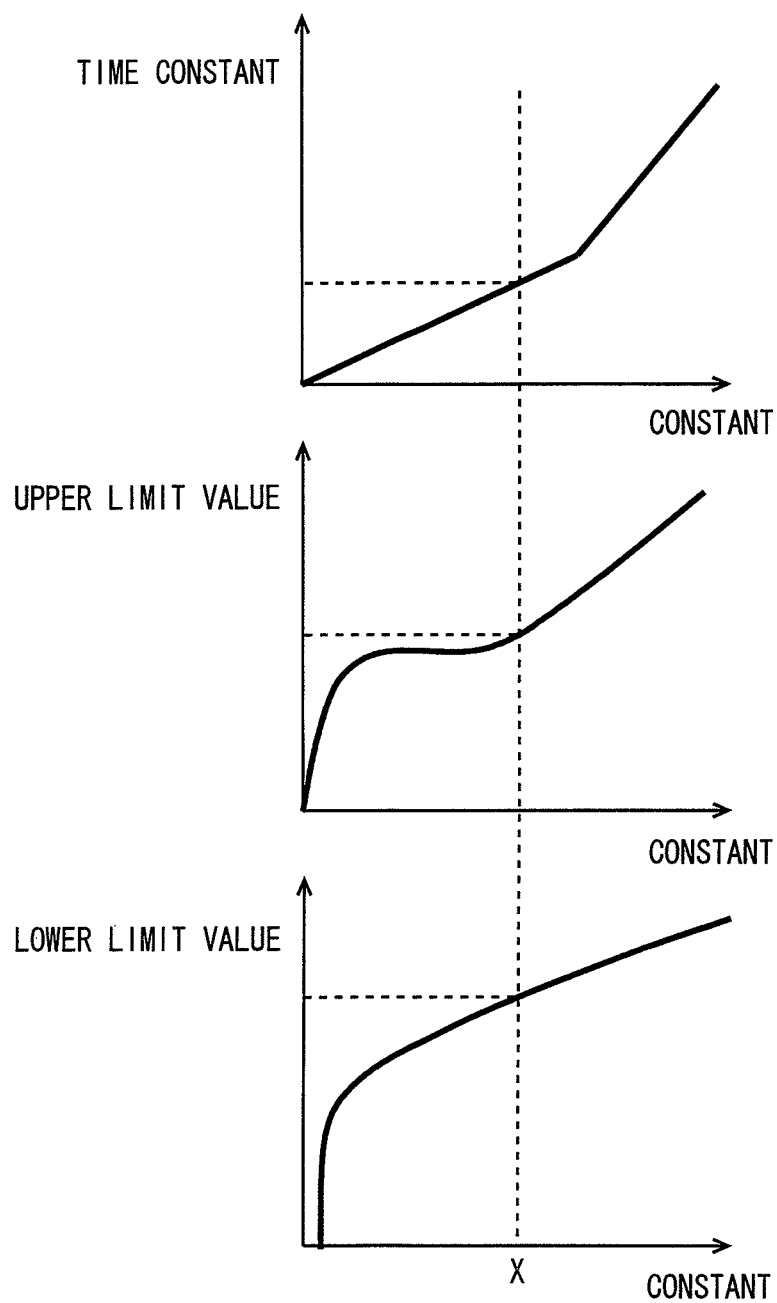
FIG. 8 is a diagram showing the map used for setting a time constant, an upper limit value and a lower limit value based on constant X.

As shown in FIG. 8, constant X is used in order to set at least one of the time constant, the upper limit value of the absolute value of the change rate of the target value, and the lower limit value of the absolute value of the change rate of the target value. In other words, when the control mode is changed, setting unit 942 of ECU 900 sets at least one of the time constant, the upper limit value and the lower limit value in accordance with constant X determined for the control mode that is higher in priority among the control modes before and after change. For example, the time constant, the upper limit value and the lower limit value are set from constant X based on the map. The map for setting the time constant, the upper limit value and the lower limit value is defined in advance by the developer, and stored in the memory and the like of ECU 900. It is to be noted that a function may be used in place of a map.

Figure 9:
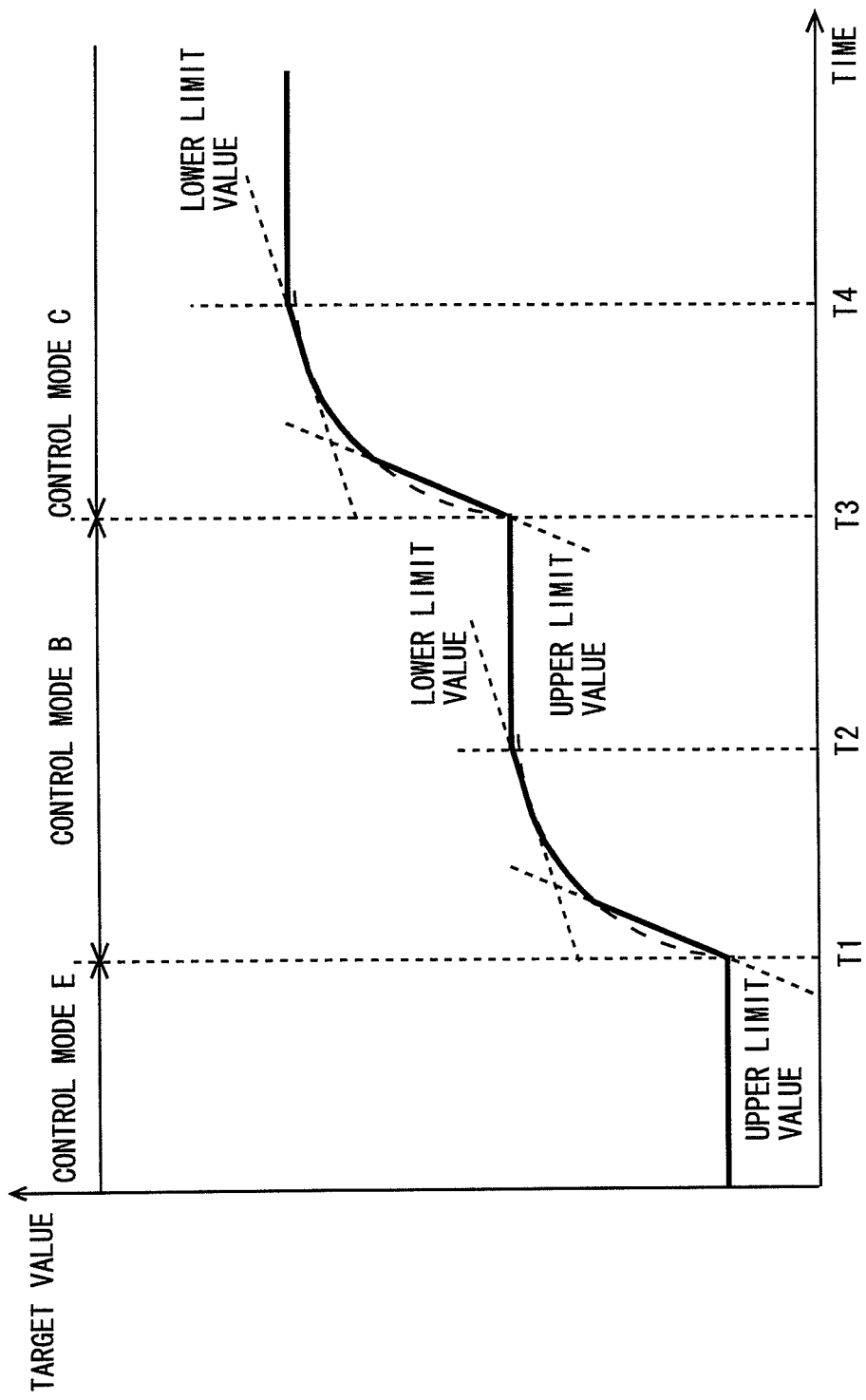
FIG. 9 is a diagram showing the target value of primary pulley revolution speed NIN set in the first embodiment.

Furthermore, as shown in FIG. 9, setting unit 942 of ECU 900 sets the target value of primary pulley revolution speed NIN so as to vary in accordance with at least one of the time constant, the upper limit value and the lower limit value that are set.

For example, the target value of primary pulley revolution speed NIN is set as a response of the first-order lag system in which the set time constant is used. Furthermore, the absolute value of the change rate of the target value of primary pulley revolution speed NIN is limited to the lower limit value or more, and limited to the upper limit value or less. It is to be noted that the method of setting the target value of primary pulley revolution speed NIN is not limited thereto. In the case where the change rate of the target value of primary pulley revolution speed NIN is determined in place of constant X, the target value of primary pulley revolution speed NIN is set so as to vary at the determined change rate.

Consequently, in both of the cases where the control mode before change is higher in priority than the control mode after change, and where the control mode after change is higher in priority than the control mode before change, the target value is set so as to vary in the pattern suitably determined for the control mode that is higher in priority.

In the example shown in FIG. 9, control mode B is higher in priority than other control modes C and E. Accordingly, the target value of primary pulley revolution speed NIN during the time period from a time T1 at which the control mode is changed to a time T2 is set based on a constant $X_1$ determined for control mode B. Similarly, the target value of primary pulley revolution speed NIN during the time period from a time T3 at which the control mode is changed to a time T4 is also set based on constant $X_1$ determined for control mode B.

Referring back to FIG. 3, a control unit 944 of ECU 900 controls continuously variable transmission 500 such that primary pulley revolution speed NIN reaches the set target value. Control unit 944 may be configured by software, by hardware or by a combination of software and hardware.

Figure 10:
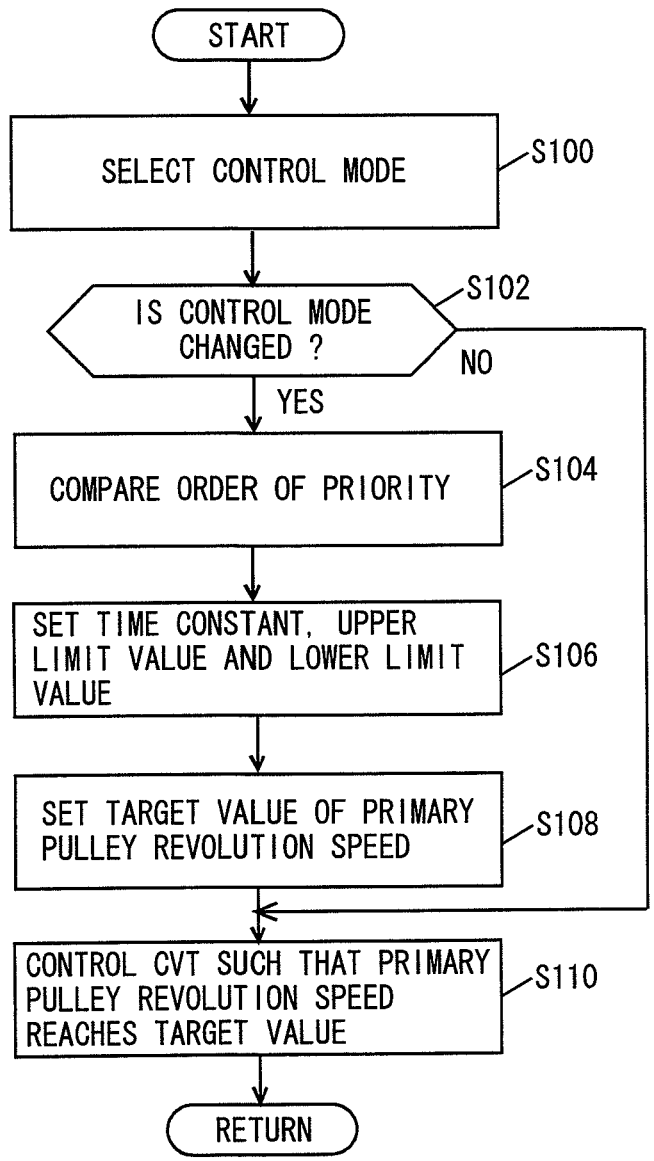
FIG. 10 is a diagram showing a flowchart of the process executed by the ECU.

Referring to FIG. 10, the process executed by ECU 900 will then be described.

In step (hereinafter abbreviated as S) 100, ECU 900 selects one control mode from a plurality of control modes each setting a target value of primary pulley revolution speed NIN and prioritized in a predetermined order.

In S102, ECU 900 determines whether or not the control mode is changed. When the control mode is changed (YES in S102), the process proceeds to S104. If not (NO in S102), the process proceeds to S110.

In S104, ECU 900 compares the priority order of the control mode before change with the priority order of the control mode after change.

In S106, ECU 900 sets at least one of the time constant, the upper limit value and the lower limit value in accordance with constant X determined for the control mode that is higher in priority among the control modes before and after change.

In S108, ECU 900 sets the target value so as to vary in accordance with at least one of the time constant, the upper limit value and the lower limit value that are set.

In S110, ECU 900 controls continuously variable transmission 500 such that primary pulley revolution speed NIN reaches the set target value.

Consequently, even if the manner of change in the target value is not defined for every combination of the control mode before change and the control mode after change, the target value of primary pulley revolution speed NIN can be set so as to suitably vary in accordance with the control mode that is higher in priority. This allows a decrease in the amount of data required for setting the target value of the revolution speed of the transmission such that this target value suitably varies.

Second Embodiment

The second embodiment will be hereinafter described. As shown in FIG. 11, constant X determined for each control mode includes at least one of a first constant XA and a second constant XB.

Figure 12:
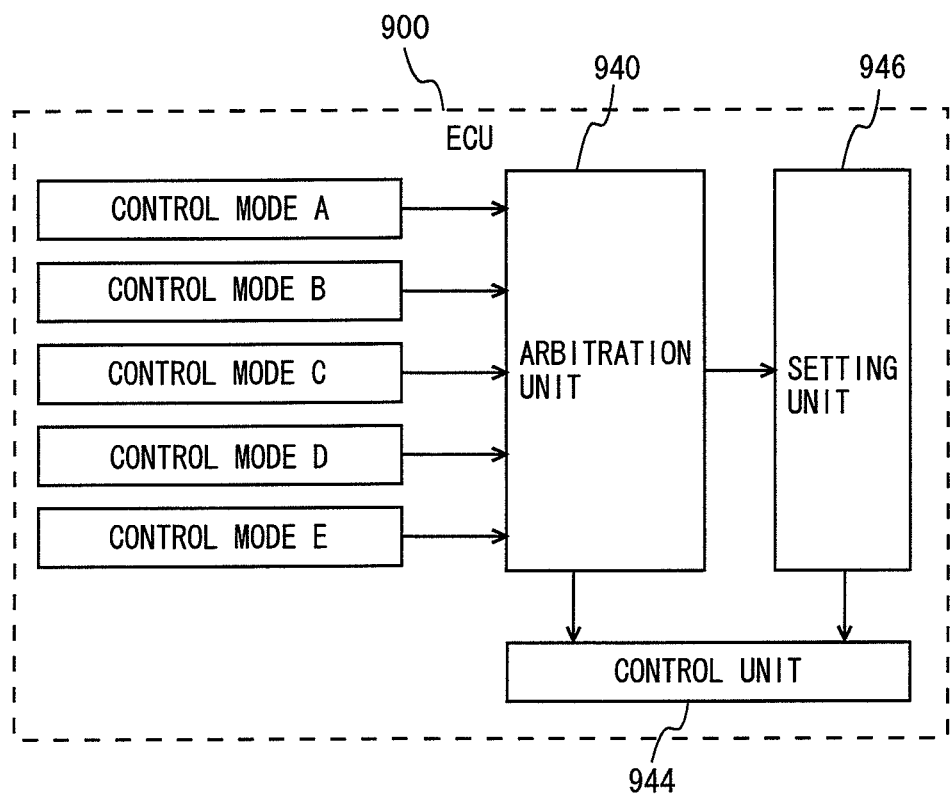
FIG. 12 is a functional block diagram of the ECU in the second embodiment.

Referring to FIG. 12, the configuration of an ECU 940 will be described. It is to be noted that the same components as in the first embodiment are designated by the same reference characters, and therefore, detailed description thereof will not be repeated.

In the case where the control mode before change is higher in priority than the control mode after change, and constant X determined for the control mode before change includes first constant XA, setting unit 946 of ECU 900 sets the target value of primary pulley revolution speed NIN so as to vary in accordance with first constant XA.

In the case where the control mode after change is higher in priority than the control mode before change, and constant X determined for the control mode after change includes second constant XB, setting unit 946 of ECU 900 sets the target value of primary pulley revolution speed NIN so as to vary in accordance with second constant XB.

In contrast, in the case where the control mode before change is higher in priority than the control mode after change, and constant X determined for the control mode before change does not include first constant XA, setting unit 946 of ECU 900 sets the target value so as to vary in accordance with a predetermined third constant XC.

Similarly, in the case where the control mode after change is higher in priority than the control mode before change, and constant X determined for the control mode after change does not include second constant XB, setting unit 946 of ECU 900 sets the target value so as to vary in accordance with third constant XC.

More specifically, in the case where the control mode before change is higher in priority than the control mode after change, and constant X determined for the control mode before change includes first constant XA, at least one of the time constant, the upper limit value and the lower limit value is set in accordance with first constant XA.

In the case where the control mode after change is higher in priority than the control mode before change, and constant X determined for the control mode after change includes the second constant, at least one of the time constant, the upper limit value and the lower limit value is set in accordance with second constant XB.

In the case where the control mode before change is higher in priority than the control mode after change, and constant X determined for the control mode before change does not include the first constant, at least one of the time constant, the upper limit value and the lower limit value is set in accordance with third constant XC.

In the case where the control mode after change is higher in priority than the control mode before change, and constant X determined for the control mode after change does not include the second constant, at least one of the time constant, the upper limit value and the lower limit value is set in accordance with third constant XC.

As in the first embodiment, setting unit 946 of ECU 900 sets the target value so as to vary in accordance with at least one of the time constant, the upper limit value and the lower limit value that are set.

Figure 13:
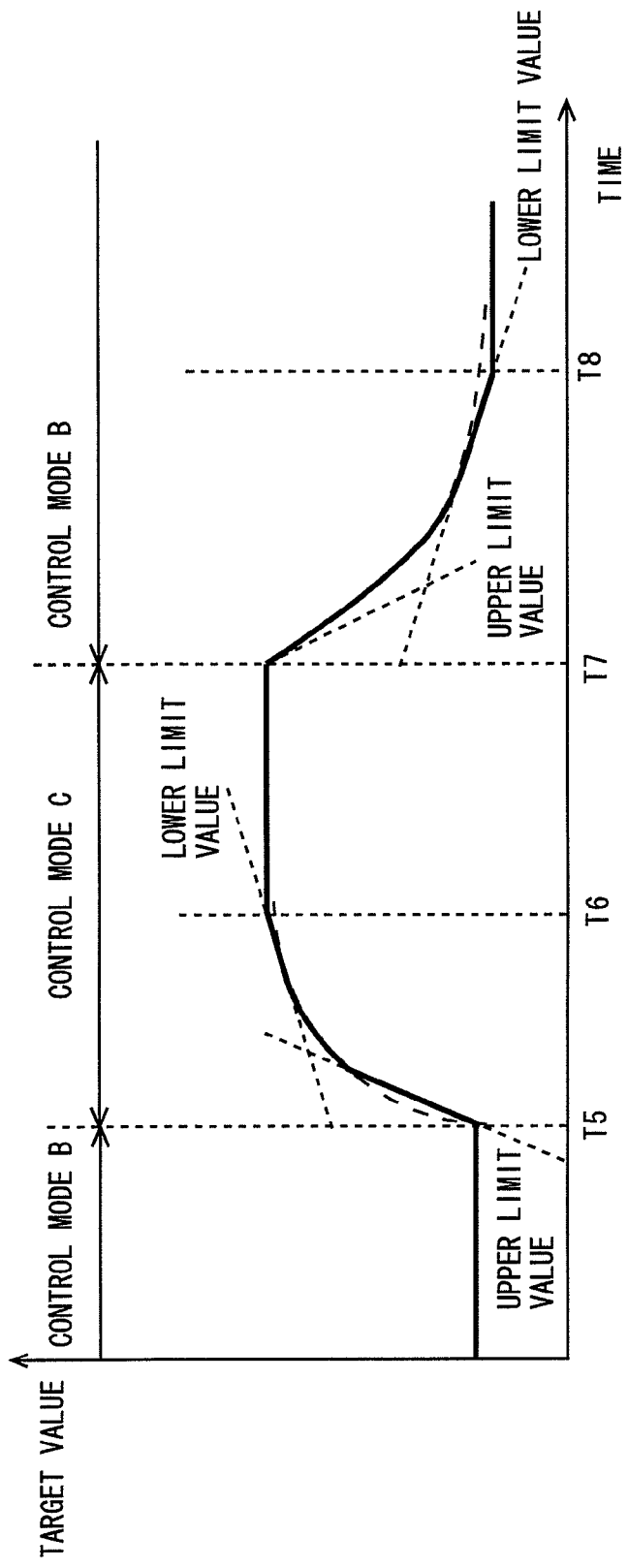
FIG. 13 is a diagram showing the target value of primary pulley revolution speed NIN set in the second embodiment.

Accordingly, as shown in FIG. 13, the change pattern of the target value of primary pulley revolution speed NIN can be rendered different between the case where control mode B that is higher in priority is selected before changing the control mode and the case where the control mode after change is control mode B.

If first constant XA or second constant XB is determined, an arbitrary change rate can be specified. In the example shown in FIG. 13, control mode B is higher in priority than control mode C. Constant $X_1$ determined for control mode B includes a first constant $XA_1$ and a second constant $XB_1$. Therefore, the target value of primary pulley revolution speed NIN during the time period from a time T5 at which the control mode is changed to a time T6 is set based on first constant $XA_1$ determined for control mode B. Similarly, the target value of primary pulley revolution speed NIN during the time period from a time T7 at which the control mode is changed to a time T8 is set based on second constant $XB_1$ determined for control mode B.

If first constant XA or second constant XB is not determined, an initial value can be set for the change rate of the target value of primary pulley revolution speed NIN. Accordingly, in the case where the change rate does not need to be specified, the target value of primary pulley revolution speed NIN suitably varies without having to determine first constant XA or second constant XB.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

100 power train, 200 engine, 300 torque converter, 400 forward and backward movement switching device, 500 continuously variable transmission, 600 reduction gear, 700 differential gear, 800 driving wheel, 900 ECU, 930 navigation system, 940 arbitration unit, 942 setting unit, 944 control unit, 946 setting unit.

The invention claimed is:

1. A vehicle comprising:
an automatic transmission mounted in said vehicle; and
a control device programmed to control said automatic transmission, wherein
said control device having a plurality of control modes selected in accordance with running conditions of said vehicle, sets a target value of an input shaft revolution speed of said automatic transmission in accordance with the selected control mode,
when said control mode is changed in accordance with a change of said running conditions, a constant used for defining the input shaft revolution speed of said automatic transmission during change of the control mode from said target value set in the control mode before change to said target value set in the control mode after change is determined for each of said plurality of control modes,
said control device is further programmed to:
select a constant determined for a control mode that is higher in predetermined priority among said control mode before change and said control mode after change, when said control mode is changed,
set at least one of a time constant of a first-order lag system, an upper limit value of a change rate of said target value and a lower limit value of the change rate of said target value based on a map and said selected constant, and
control, based on at least one of said time constant, said upper limit value or said lower limit value that have been set, the input shaft revolution speed of said automatic transmission when said control mode is changed.

2. The vehicle according to claim 1, wherein said automatic transmission is a continuously variable transmission.

3. A method of controlling a transmission,
said transmission being an automatic transmission mounted in a vehicle,
a plurality of control modes selected in accordance with running conditions of said vehicle being defined, said method using an electronic control unit programmed to perform the steps of:
setting a target value of an input shaft revolution speed of said automatic transmission in accordance with the selected control mode,
when said control mode is changed in accordance with a change of said running conditions, a constant used for defining the input shaft revolution speed of said automatic transmission during change of the control mode from said target value set in the control mode before change to said target value set in the control mode after change being determined for each of said plurality of control modes, said method further using the electronic control unit programmed to perform the steps of:
selecting a constant determined for a control mode that is higher in predetermined priority among said control mode before change and said control mode after change, when said control mode is changed, setting at least one of a time constant of a first-order lag system, an upper limit value of a change rate of a said target value or a lower limit value of the change rate of said target value based on a map and said selected constant, and controlling the input shaft revolution speed of said automatic transmission, based on at least one of said time constant, said upper limit value or said lower limit value that have been set, when said control mode is changed.

4. A control device for a transmission, said transmission being an automatic transmission mounted in a vehicle, a plurality of control modes selected in accordance with running conditions of said vehicle being defined, said control device comprising:

means for setting a target value of an input shaft revolution speed of said automatic transmission in accordance with the selected control mode, when said control mode is changed in accordance with a change of said running conditions, a constant used for defining the input shaft revolution speed of said automatic transmission during change of the control mode from said target value set in the control mode before change to said target value set in the control mode after change being determined for each of said plurality of control modes, said control device further comprising:

means for selecting a constant determined for a control mode that is higher in predetermined priority among said control mode before change and said control mode after change, when said control mode is changed, means for setting at least one of a time constant of a first-order lag system, an upper limit value of a change rate of said target value or a lower limit value of the change rate of said target value based on a map and said selected constant, and means for controlling the input shaft revolution speed of said automatic transmission, based on at least one of said time constant, said upper limit value or said lower limit value that have been set, when said control mode is changed.

* * * * *